US012232452B2

(12) United States Patent
Dilts

(10) Patent No.: US 12,232,452 B2
(45) Date of Patent: Feb. 25, 2025

(54) CONTROL OF RESIDUE SPREAD PATTERN BY CONTINUOUSLY VARYING DISTRIBUTION FREQUENCY

(71) Applicant: CNH Industrial America LLC, New Holland, PA (US)

(72) Inventor: Mark D. Dilts, New Holland, PA (US)

(73) Assignee: CNH Industrial America LLC, Holland, PA (US)

( * ) Notice: Subject to any disclaimer, the term of this patent is extended or adjusted under 35 U.S.C. 154(b) by 798 days.

(21) Appl. No.: 17/466,226

(22) Filed: Sep. 3, 2021

(65) Prior Publication Data

US 2023/0076080 A1    Mar. 9, 2023

(51) Int. Cl.

| | | |
|---|---|---|
| A01F 12/44 | (2006.01) | |
| A01D 41/127 | (2006.01) | |
| A01F 12/18 | (2006.01) | |
| A01F 12/58 | (2006.01) | |
| A01B 13/12 | (2006.01) | |
| A01D 87/00 | (2006.01) | |
| A01F 25/18 | (2006.01) | |
| A01F 29/12 | (2006.01) | |

(52) U.S. Cl.
CPC ........ *A01F 12/442* (2013.01); *A01D 41/1274* (2013.01); *A01D 41/1276* (2013.01); *A01F 12/181* (2013.01); *A01F 12/184* (2013.01); *A01F 12/58* (2013.01); *A01B 13/12* (2013.01); *A01D 87/00* (2013.01); *A01D 87/0046* (2013.01); *A01F 25/18* (2013.01); *A01F 29/12* (2013.01)

(58) Field of Classification Search
CPC .... A01F 12/442; A01F 12/181; A01F 12/184; A01F 12/58; A01F 25/18; A01B 13/12; A01D 41/1274; A01D 41/1276; A01D 87/00; A01D 87/0046
See application file for complete search history.

(56) References Cited

U.S. PATENT DOCUMENTS

| | | | |
|---|---|---|---|
| 4,913,969 A | | 4/1990 | Schulte et al. |
| 5,797,793 A | * | 8/1998 | Matousek .......... A01D 41/1243 460/119 |
| 7,223,168 B2 | * | 5/2007 | Anderson ............... A01F 12/40 460/111 |

(Continued)

FOREIGN PATENT DOCUMENTS

| | | |
|---|---|---|
| CA | 1144031 A | 4/1983 |
| EP | 0300302 A2 | 1/1989 |
| EP | 02266381 A1 | 12/2010 |

OTHER PUBLICATIONS

Extended European Search Report for EP Application No. 22193778.2 dated Jan. 24, 2023 (seven pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A combine having a feeder housing for receiving harvested crop, a separating system for threshing the harvested crop to separate grain from residue, a residue spreader wheel spinning for expelling the residue from the combine, and a controller that controls the combine. The controller is configured to control the residue spreader wheel to continuously oscillate between a first speed less than a nominal speed and a second speed greater than the nominal speed while spreading the residue.

8 Claims, 12 Drawing Sheets

(56) References Cited

U.S. PATENT DOCUMENTS

| | | | |
|---|---|---|---|
| 7,306,174 B2* | 12/2007 | Pearson | A01F 12/40 |
| | | | 239/665 |
| 7,390,253 B2* | 6/2008 | Farley | A01D 41/1243 |
| | | | 460/111 |
| 8,010,262 B2* | 8/2011 | Schroeder | A01D 41/1243 |
| | | | 701/50 |
| 9,516,812 B2 | 12/2016 | Baumgarten et al. | |
| 9,974,232 B2* | 5/2018 | Shane | A01D 41/1243 |
| 11,547,048 B2* | 1/2023 | De Baere | A01D 41/1243 |
| 2009/0287380 A1* | 11/2009 | Chervenka | A01D 41/1243 |
| | | | 701/50 |
| 2011/0237316 A1* | 9/2011 | Isaac | A01D 41/1243 |
| | | | 460/111 |
| 2013/0095899 A1* | 4/2013 | Knapp | A01D 41/127 |
| | | | 460/111 |
| 2014/0302897 A1* | 10/2014 | Isaac | A01D 41/127 |
| | | | 460/111 |
| 2015/0351321 A1 | 12/2015 | Shane | |
| 2016/0081270 A1* | 3/2016 | Ricketts | A01D 41/1243 |
| | | | 460/21 |
| 2016/0088794 A1 | 3/2016 | Baumgarten et al. | |
| 2017/0086372 A1 | 3/2017 | Palla et al. | |
| 2017/0202143 A1* | 7/2017 | Garton | G05B 15/02 |
| 2019/0059232 A1* | 2/2019 | Ricketts | A01F 12/444 |
| 2019/0350132 A1* | 11/2019 | Issac | A01D 41/1243 |
| 2020/0100427 A1* | 4/2020 | Beavers | A01F 29/12 |
| 2021/0127573 A1 | 5/2021 | Mahieu et al. | |

* cited by examiner

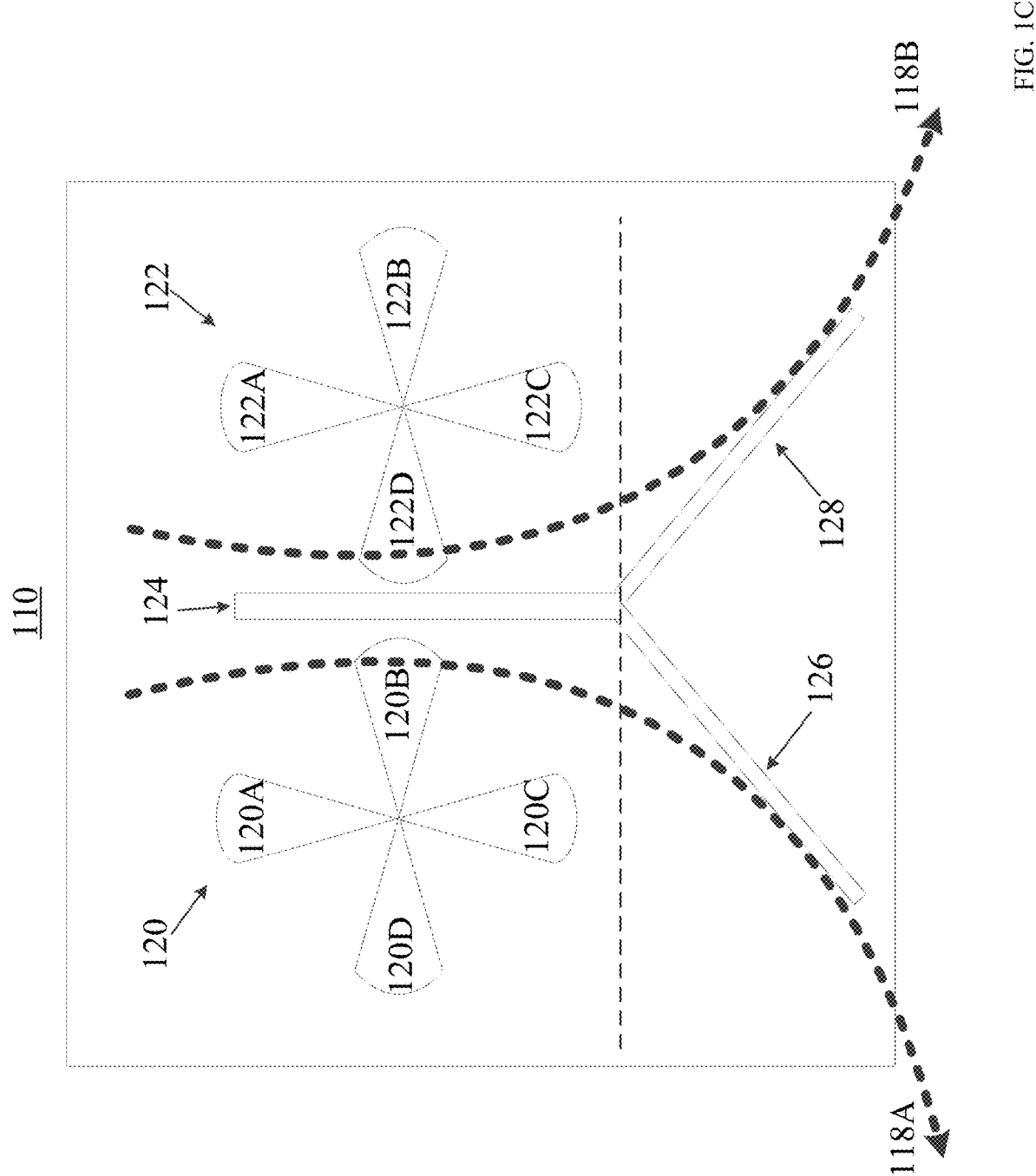

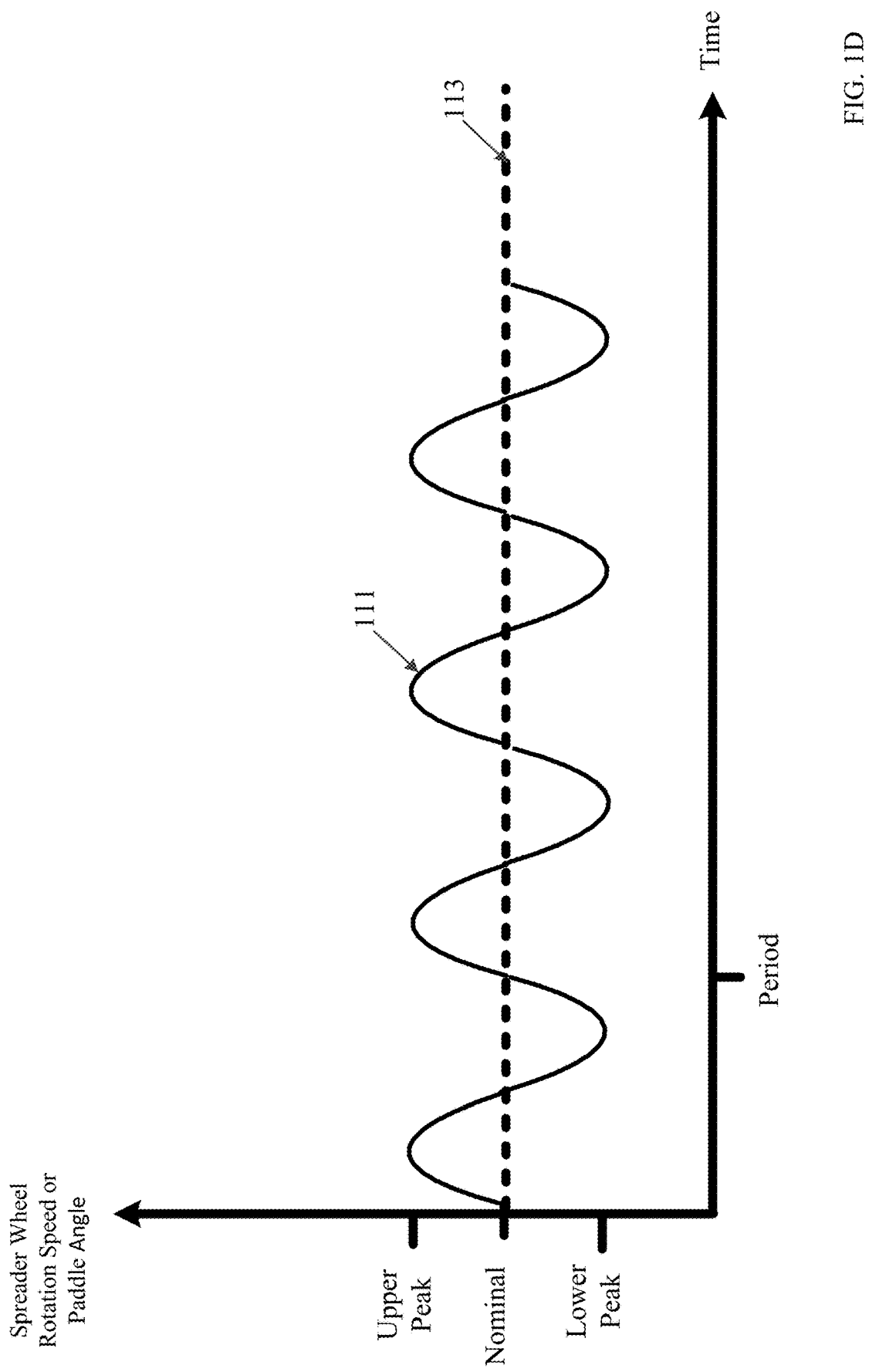

CONTROL OF RESIDUE SPREAD PATTERN BY CONTINUOUSLY VARYING DISTRIBUTION FREQUENCY

FIELD OF THE INVENTION

The invention relates to residue spreading pattern system and method for implementation in a harvester combine.

BACKGROUND OF THE INVENTION

Combine harvesters implement various functions of crop gathering, threshing, separating, conveying and spreading residue back to the field. Many existing combines are susceptible to non-uniform residue spread patterns.

SUMMARY OF THE INVENTION

An embodiment includes a combine having a feeder housing for receiving harvested crop, a separating system for threshing the harvested crop to separate grain from residue, a residue spreader wheel spinning for expelling the residue from the combine, and a controller that controls the combine. The controller is configured to control the residue spreader wheel to continuously oscillate between a first speed less than a nominal speed and a second speed greater than the nominal speed while spreading the residue.

Another embodiment includes a combine having a feeder housing for receiving harvested crop, a separating system for threshing the harvested crop to separate grain from residue, a residue spreader wheel spinning and having paddles extending at an angle for expelling the residue from the combine, and a controller that controls the combine. The controller is configured to control the paddles of residue spreader wheel to continuously oscillate between a first angle less than a nominal angle and a second angle greater than the nominal angle while spreading the residue.

BRIEF DESCRIPTION OF THE FIGURES

FIG. 1C is a diagram of the residue spreader system of a combine, according to an embodiment of the invention.

FIG. 1D is a data plot of spreader wheel rotational speed and/or paddle angle vs. time for achieving a uniform residue spread pattern, according to an embodiment of the invention.

DETAILED DESCRIPTION OF THE INVENTION

Aspects of the disclosure provide methods and systems for controlling spreader wheel rotational speed and/or spreader wheel paddle angles to achieve a uniform residue spread pattern.

The terms "grain" and "residue" are used principally throughout this specification for convenience but it is to be understood that these terms are not intended to be limiting. "Grain" refers to that part of the crop material which is threshed and separated from the discardable part of the crop material, which is referred to as non-grain crop material, material other than grain (MOG). "Residue" refers to MOG that is to be discarded from the combine. Also the terms "fore", "aft", "left," and "right", when used in connection with the agricultural harvester (e.g. combine) and/or components thereof are usually determined with reference to the direction of forward operative travel of the combine, but again, they should not be construed as limiting.

Figure 1A:
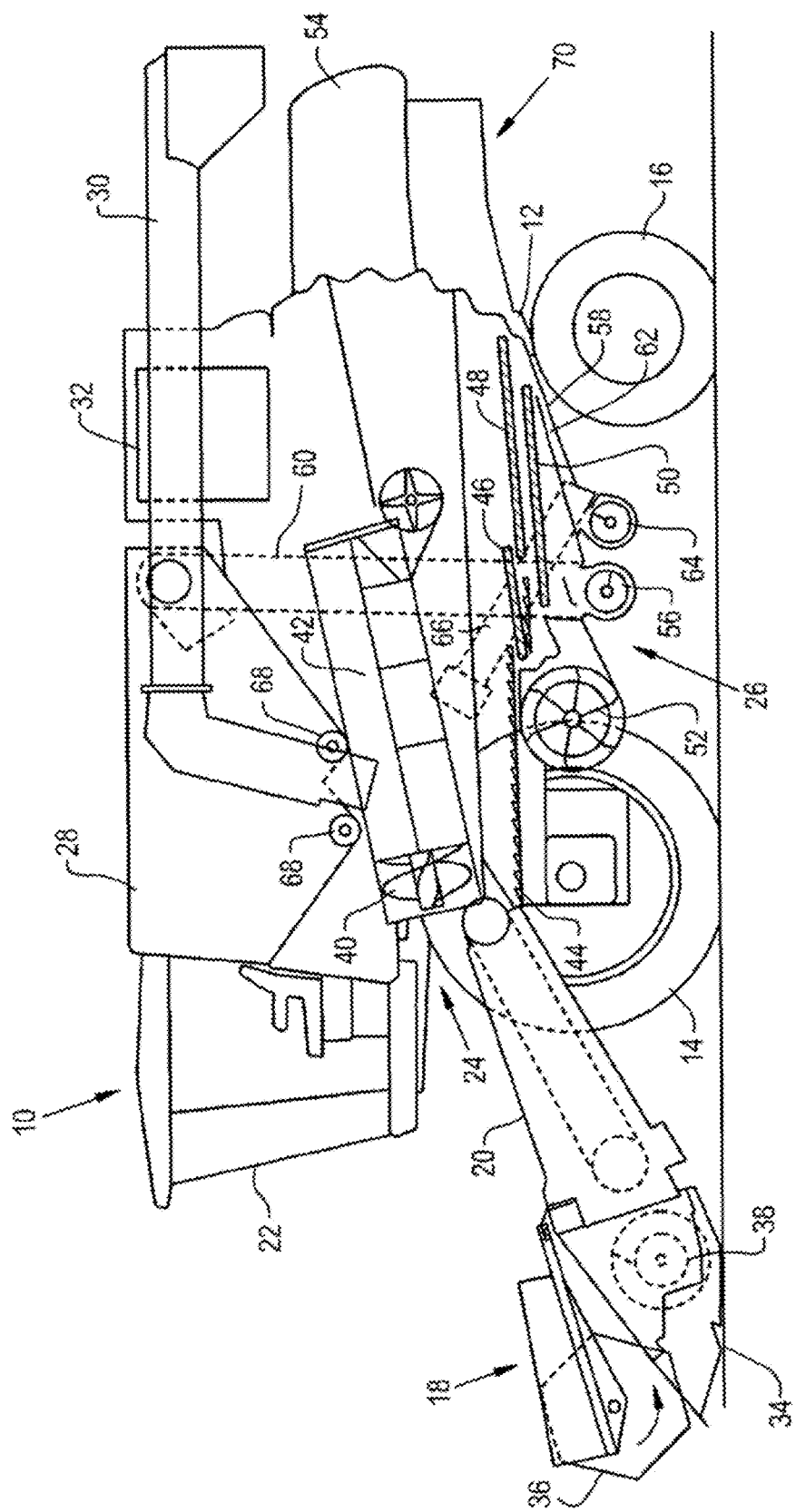
FIG. 1A is a side view of a combine, according to an embodiment of the invention.

Referring now to the drawings, and more particularly to FIG. 1A, there is shown one embodiment of an agricultural harvester in the form of a combine 10 (e.g. longitudinal rotary combine), which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated concave 42. The cut crops are threshed and separated by the rotation of rotor 40 within concave 42, and larger MOG elements, such as stalks, leaves and the like are discharged from residue system 70 of combine 10. Smaller elements of crop material including grain and smaller MOG materials including particles lighter than grain, such as chaff, dust and straw, are discharged through perforations of concave 42.

The combine controller may be a programmable logic controller, micro-controller, etc. The combine controller is programmable by the operator of the combine through a user (e.g. operator) interface, or through a remote computer. The operator, for example, enters commands through the user interface. In response to these commands, the controller sends control signals to the various actuators of combine 10.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

The remaining non-grain crop material (i.e. residue) proceeds through a residue handling system 70. Residue handling system 70 includes a chopper, a chopper pan, counter knives, a windrow door, a windrow chute and a residue spreader, which are not shown in FIG. 1B. When combine 10 is operating in the chopping and spreading mode, the chopper is set to a relatively high speed, and the counter knives may be engaged, the windrow door is closed and the residue spreader is running (e.g. rotating). This causes the non-grain crop material to be chopped in to pieces of approximately 6 inches or less and spread on the ground in a uniform manner. In contrast, when combine 10 is operating in the windrow mode, the chopper is at a relatively low speed, the counter knives are disengaged and the windrow door is open. The residue spreader may continue operation to spread only the chaff, with the crop material passing through the passageway created by the open windrow door and guided by a windrow chute as it exits the combine.

The clean grain output by separating assembly 24 falls to a clean grain auger 56 positioned crosswise below and in front of lower sieve 50. Clean grain auger 56 receives clean grain from each sieve 48, 50 and from bottom pan 58 of cleaning system 26. Tailings from cleaning system 26 fall to a tailings auger trough 62. The tailings are transported via tailings auger 64 and return auger 66 to the upstream end of cleaning system 26 for repeated cleaning action. Clean grain auger 56 conveys the clean grain laterally to a generally vertically arranged grain elevator 60 for transport to grain tank 28.

Figure 1B:
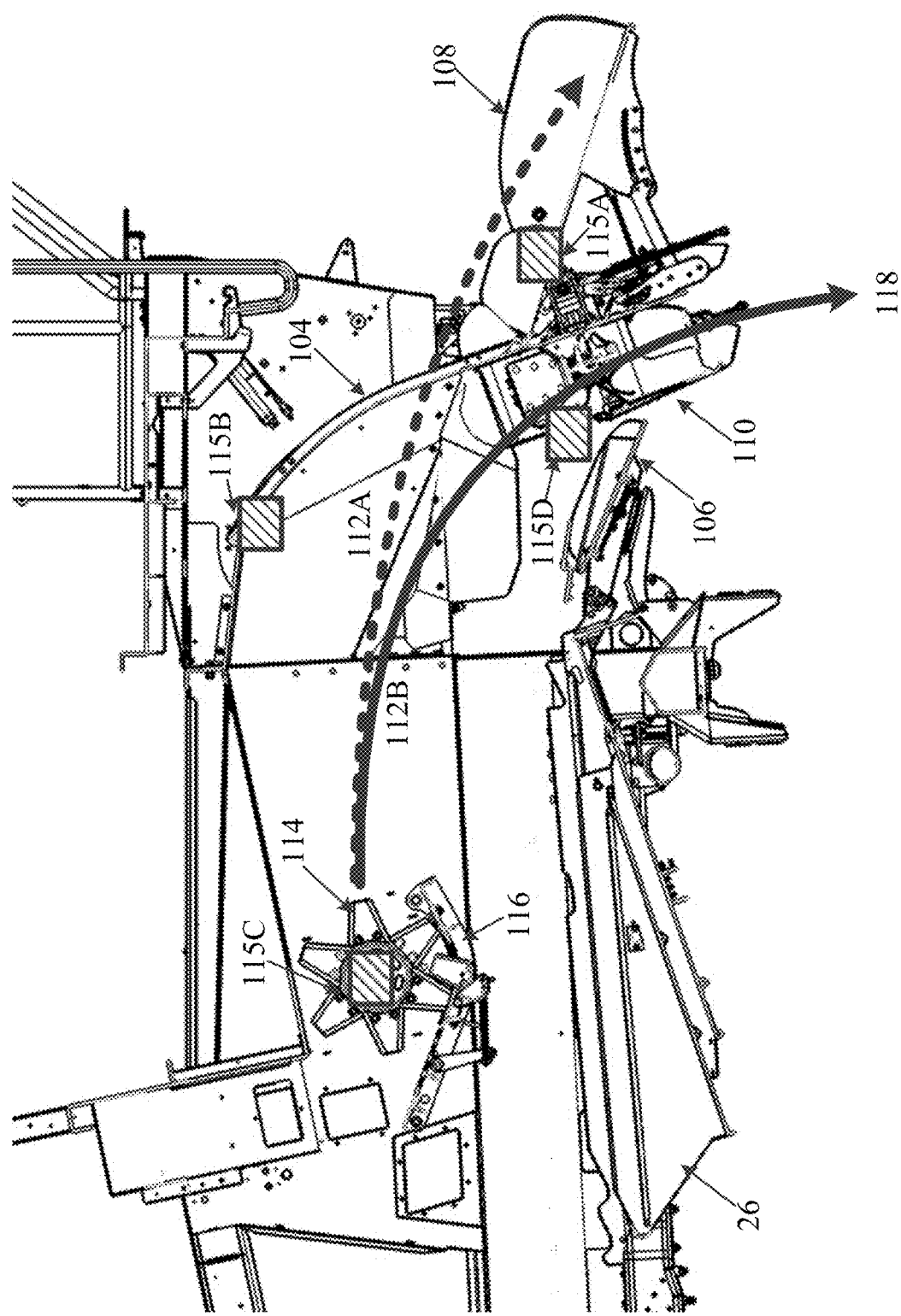
FIG. 1B is a side view of the residue system of a combine, according to an embodiment of the invention.

As shown in FIG. 1B, residue system 70 includes a windrow door 104, a spreader chute 106, a windrow chute 108, spreader wheel system 110, spreader deflectors (not shown), chopper wheel 114 and chopper pan 116.

As shown in FIG. 1B, devices 115A-115D include actuators for operating windrow door 104, spreader wheel system 110, spreader deflectors, and chopper wheel 114. These actuators are either electrical actuators that are electrically connected to a controller (e.g. programmable logic controller, micro-controller, etc.) located in the combine, or are hydraulic actuators that are driven by hydraulic devices such as valves and pumps that are electrically connected to the controller. Devices 115A-115D may also include sensors for monitoring the operational status of the actuators, and/or the operational status of windrow door 104, spreader wheel system 110, spreader deflectors, and chopper wheel 114. The controller is programmable by the operator of the combine through a user (e.g. operator) interface, or through a remote computer (see FIG. 3A for further details). The operator, for example, enters commands through the user interface. In response to these commands, the controller sends control signals to the various actuators of residue handling system 70.

As mentioned above, residue handling system 70 spreads the chopped up residue via path 112B as shown in FIG. 1B. Further details of the spreader wheel system and spreader deflectors are shown in FIG. 1C. Spreader wheel system 110 is shown to include driver-side spreader wheel 120, passenger-side spreader wheel 122, optional divider 124, driver-side deflector 126, and passenger-side deflector 128. In general, spreader wheels 120 and 122 rotate paddles 120A-122D and 122A-122D (e.g. four paddles on each wheel) at a predetermined speed which contact and eject the residue from the combine via paths 118A and 118B respectively which are affected by both the speeds (RPM1, RPM2) of wheels 120 and 122, the angles of the paddles, and the angles of deflectors 126 and 128. This allows the combine to control the speed, angle and density at which the residue is ejected from the residue system. These variables (wheel rotational speeds and/or paddle angles) are controlled to produce a desirable (e.g. smooth/uniform) residue spread on the ground and avoid streaks and unevenness. It is noted that although the spreader wheels are shown in FIG. 1C to have four paddles, this is for explanatory purposes. In practice, the spreader wheels could have a different number of paddles.

In general, the combine controller can vary the rotational speed of spreader wheels 120/122 and/or the angles of paddles 120A/122A-120D/122D to control the distance of residue being ejected from the combine. FIG. 1D shows an example of varying the rotational speed of spreader wheels 120/122 and/or the angles of paddles 120A/122A-120D/122D in an oscillatory manner to produce a uniform residue spread.

For example, FIG. 1D shows data plot 11 of an oscillating spreader wheel rotational speed and/or paddle angle vs. time with respect to a nominal spreader wheel rotational speed and paddle angle. In this example, a nominal speed 113, an oscillation period value and an oscillation range between a lower oscillation peak value and an upper oscillation peak value may be set either manually by the operator or automatically by the controller. These values may be determined based on various factors including but not limited to crop type, crop moisture, combine speed and environmental/terrain conditions.

In a first example, the a nominal wheel rotational speed may be set at 300 rpm, the oscillation range between a lower oscillation peak value of 200 rpm and an upper oscillation peak value of 400 rpm, while the oscillation period value may be set to 1 second. This would result in the controller oscillating the rotational speed the spreader wheels 120/122 between 200 rpm and 400 rpm every second. Although this oscillation is shown as a sinusoidal oscillation in FIG. 1D, it is noted that other types of oscillation are possible (e.g. square wave, saw tooth, etc.). In practice the oscillation behavior for varying rotational speed is achieved by motor control techniques such as pulse width modulation (PWM).

In a second example, the a nominal paddle angle may be set at 67.5°, the oscillation angle range between a lower oscillation peak value of 45° and an upper oscillation peak value of 90°, while the oscillation period value may be set to 1 second. This would result in the controller oscillating the paddle angles of spreader wheels 120/122 between 45° and 90° every second. In practice the oscillation behavior is achieved by a combination of motor control techniques and mechanisms that convert rotational movement of the motor to linear movement.

In either case, when the rotational speed or paddle angle is decreased during the oscillation, the residue is thrown at a shorter distance from the combine, whereas when the rotational speed or paddle angle is increased during the oscillation, the residue is thrown at a further distance from the combine. This has the effect of producing a uniform residue spread on the ground.

Paddle angles can be varied in different manners. For example, the pitch angle or the radial angle can be varied in the oscillatory manner described above. These examples are now described below with respect to FIGS. 1E and 1F.

Figure 1E:
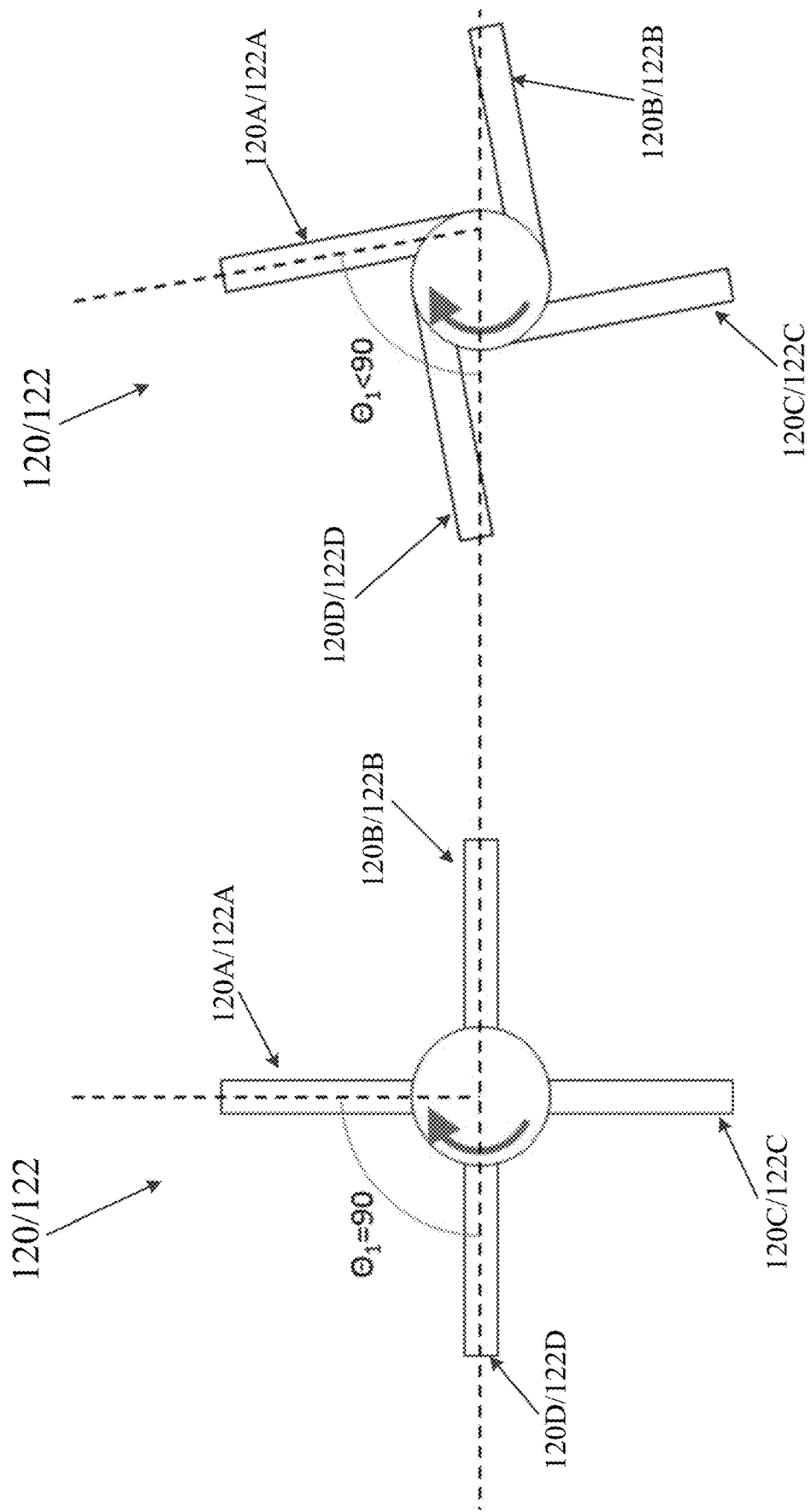
FIG. 1E is a diagram of a residue spreading wheel of a combine showing varying paddle radial angles, according to an embodiment of the invention.

For example, FIG. 1E shows a side view diagram of a residue spreading wheel of a combine showing varying paddle radial angles, according to an embodiment of the invention. As shown on the left side of FIG. 1E, paddles 120A/122A-120D/122D have radial angle (angle of paddle relative to the radial center of the wheel shown by the dashed line) of $\theta 1=90°$. This large radial angle may be beneficial for increasing friction between the paddles and the residue, thereby imparting increased energy on the residue which results in ejecting residue at a greater distance from the combine. In contrast, the as shown on the right side of FIG. 1E, paddles 120A/122A-120D/122D have radial angle (angle of paddle relative to the radial center of the wheel shown by the dashed line) of $\theta 1<90°$. This smaller radial angle may be beneficial for decreasing friction between the paddles and the residue, thereby imparting decreased energy on the residue which results in ejecting the residue a shorter distance from the combine. Thus, the combine controller can vary (e.g. oscillate) the radial angle of paddles 120A/122A-120D/122D to control the distance of residue being ejected from the combine. In the example shown in FIG. 1E, the angle of rotation is shown by the arrow to be clockwise. However, it is noted that the angle of rotation in this example may be counter clockwise.

Figure 1F:
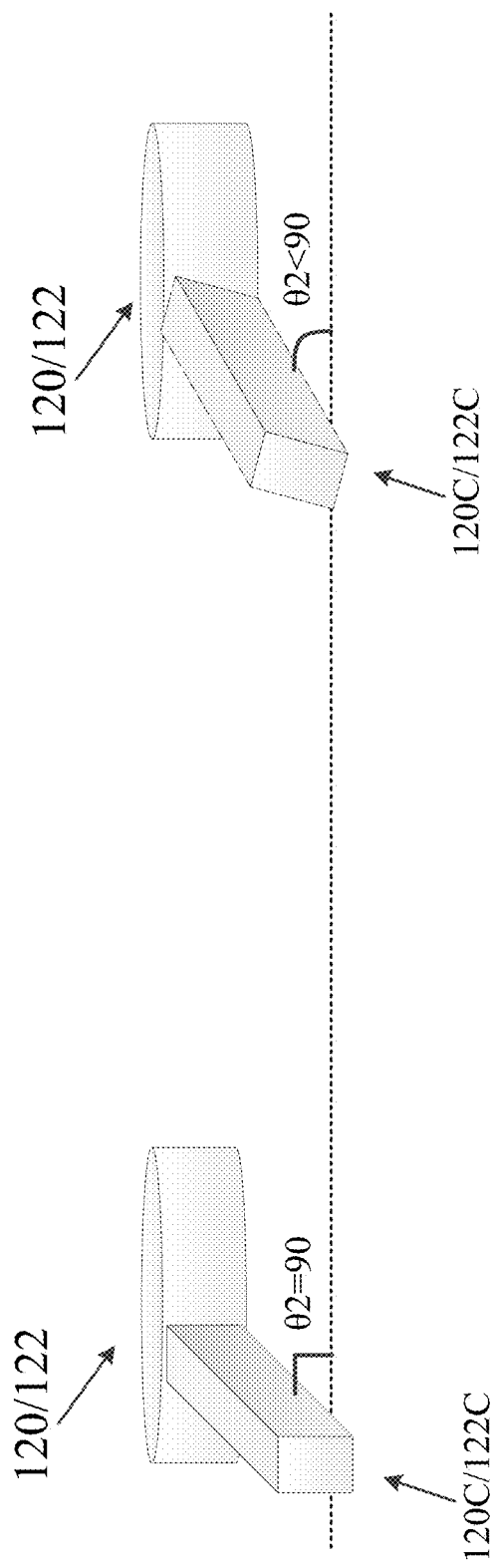
FIG. 1F is another diagram of a residue spreading wheel of a combine showing varying paddle pitch angles, according to an embodiment of the invention.

In another example, FIG. 1F shows perspective view diagram of a residue spreading wheel of a combine showing varying paddle pitch angles, according to an embodiment of the invention. It is noted that although FIG. 1F only shows spreader paddle 120C/122C, this is for explanatory purposes.

As shown on the left side of FIG. 1F, paddle 120C/122C has pitch angle (angle of paddle relative to the rotational plane of the wheel shown by the dashed line) of $\theta 2=90°$. In contrast, the as shown on the right side of FIG. 1F, paddle 120C/122C has a pitch angle (angle of paddle relative to the rotational plane of the wheel shown by the dashed line) of $\theta 2<90°$. The pitch angle relative to the rotational direction of wheels 120/122 has an effect of either increasing or decreasing the friction between the paddles and the residue, thereby imparting either an increased or decreased energy on the residue which results in ejecting the residue at either a greater or shorter distance from the combine. Thus, the combine controller can therefore vary (e.g. oscillate) the pitch angles of paddles 120A/122A-120D/122D to control the distance of the residue being ejected from the combine.

In either example, varying the radial and/or pitch angles of paddles 120A/122A-120D/122D is performed by actuators (not shown) within the spreader wheel connected to paddles 120A/122A-120D/122D. The actuators are controlled by the combine controller to vary the angles of paddles 120A/122A-120D/122D.

Figure 2:
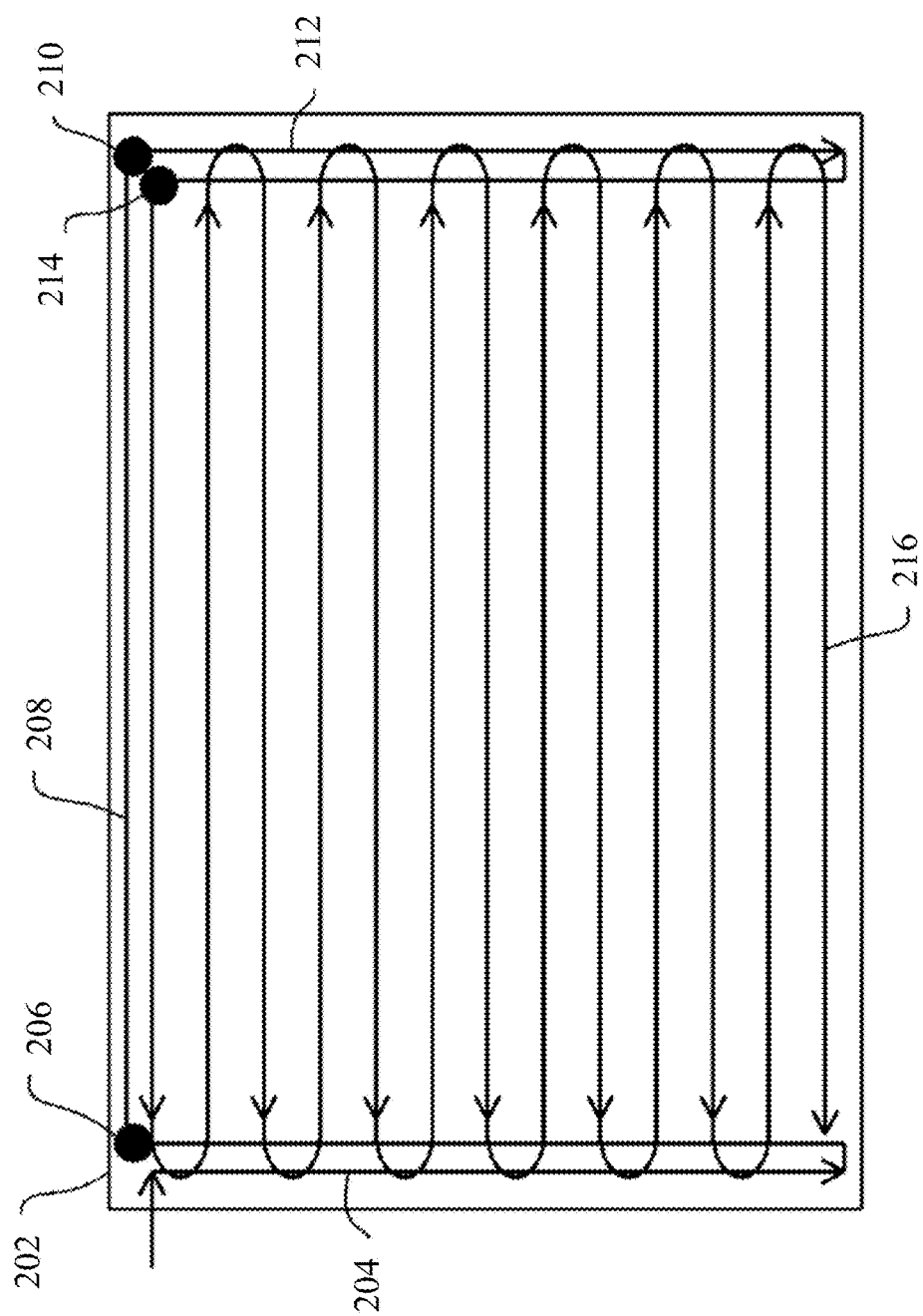
FIG. 2 is a diagram of harvesting/spreading path for a combine, according to an embodiment of the invention.

The pathways shown in FIG. 2 are typical for a plot of land 202 that is to be harvested. Typically, as harvesting is performed, the combine may employ residue system 70 to perform spreading and/or windrowing of the harvested crops at different locations of the field. For example, the combine may start performing spreading along path 204. Once the combine reaches point 208, a turn is made and spreading is performed along path 206. Once the combine reaches point 210, a turn is made and spreading is performed along path 212. Finally, once the combine reaches point 214, a turn is made and windrowing is performed in a zig-zag pattern along path 216.

In the spreading zones (e.g. while traveling the pathways shown in FIG. 2), the combine controls the speeds of wheels 120 and 122 and/or angles of the wheel paddles 120A/122A-120D/122D in the residue spreading system to achieve a desirable (e.g. uniform) residue spread. The speeds of wheels 120 and 122 and/or angles of the wheel paddles 120A/122A-120D/122D may initially be set manually by the combine operator, or they may initially be set by the combine controller. When setting these variables manually, the operator may use a number of factors including but not limited to their experience, combine heading, crop type, and weather forecasts (e.g. wind speed/direction). When setting these variables automatically, the combine controller may use a number of factors including but not limited to past results, combine heading, crop type, weather forecasts (e.g. wind speed/direction) and desired spread characteristics (e.g. density, uniformity, etc.).

Once the speeds of wheels 120 and 122 and/or angles of the wheel paddles 120A/122A-120D/122D are initially set, the combine may monitor an observable output such as images of the spread captured by a camera (not shown) mounted to the combine, and automatically adjust the speeds of wheels 120 and 122 and/or angles of the wheel paddles based on observable output of the spreader. In the manual adjustment scenario, the initial speeds of wheels 120 and 122 and/or angles of the wheel paddles 120A/122A-120D/122D are set either using predetermined values or based on operator experience. Once harvesting begins, the operator is able to visually observe the residue spread. If the residue spread is desirable, the operator can simply continue harvesting. If the residue spread is undesirable, the operator can make adjustments (e.g. oscillation peak range, oscillation frequency, nominal frequency, etc.).

Figure 3A:
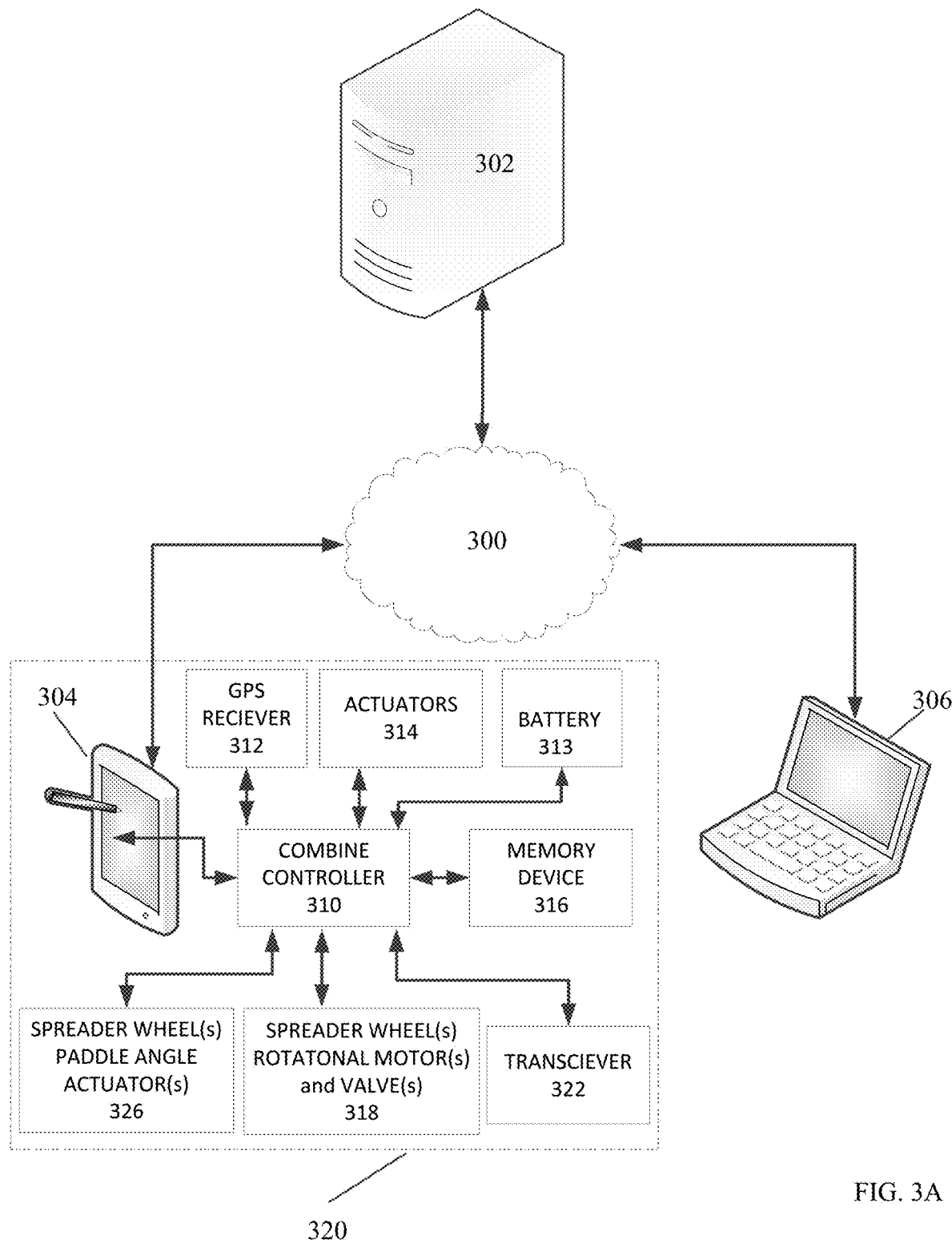
FIG. 3A is a view of the communication between the combine control system and an external network, according to an embodiment of the invention.

FIG. 3A shows an example of a system for controlling the combine. The system includes an interconnection between a control system 318 of combine 10, a remote PC 306 and a remote server 302 through network 300 (e.g. Internet). It should be noted that combine 10 does not have to be connected to other devices through a network. The controller of combine 10 can be a standalone system that receives operating instructions (e.g. speeds of wheels 120 and 122 and/or angles of the wheel paddles 120A/122A-120D/122D) through a user interface, or through a removable memory device (e.g. Flash Drive).

Prior to operating combine 10, an operator may designate grain information (e.g. type of grain, moisture content of grain, etc.) as well as speeds of wheels 120 and 122 and/or angles of the wheel paddles 120A/122A-120D/122D. In one example, the operator uses interface 304 of the combine control system or PC 306 located at remote location 308. Interface 304 and PC 306 allow the operator to view locally stored parameters from memory device 316 and/or download parameters from server 302 through network 300. The operator may select (via Interface 304 or PC 306) appropriate speeds of wheels 120 and 122 and/or angles of the wheel paddles 120A/122A-120D/122D based on various factors including, among others, the type of crop to be harvested by the combine, and the terrain. Once the speeds of wheels 120 and 122 and/or angles of the wheel paddles 120A/122A-120D/122D are selected, the operator can begin harvesting. Combine controller 312 then controls spreader wheel rotational motors 318 (e.g. electric motors, hydraulic motors, hydraulic valves, etc.) and/or valves and spreader wheel paddle angle actuators 326 based on the instructions. It is noted that harvesting may also be tracked and aided by GPS receiver 312.

Figure 3B:
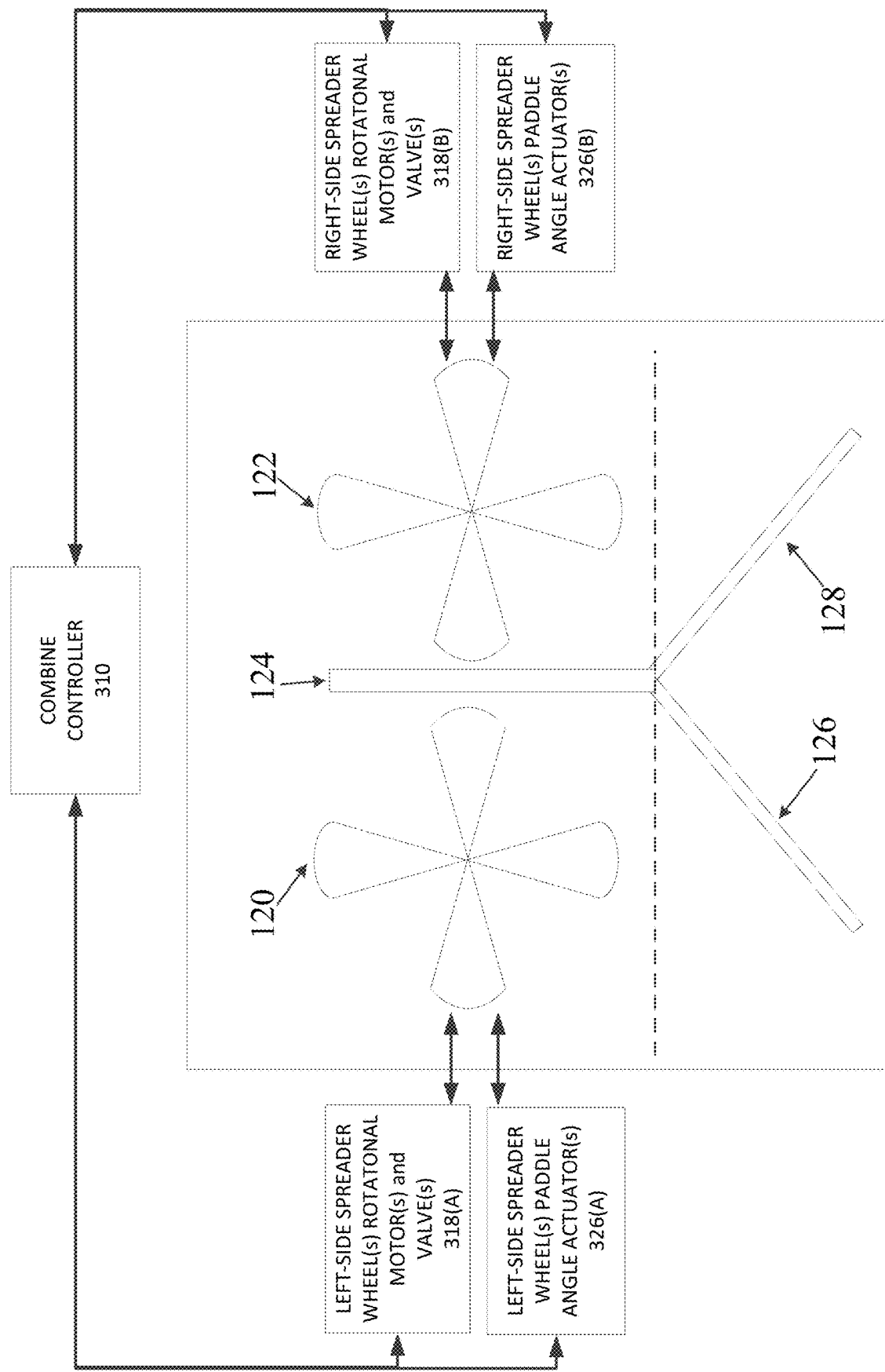
FIG. 3B is a view of the communication between the combine controller and the spreader wheel drive system, according to an embodiment of the invention.

FIG. 3B is a view of the communication between the combine controller and the spreader wheel drive system, according to an embodiment of the invention. In this example, combine controller 310 controls left-side spreader wheel rotational motor(s) and/or valves 318A (e.g. electric motors for electrically driven wheels 120/122, or hydraulic valves and/or hydraulic motors for hydraulically driven wheels 120/122) for controlling rotational speed of wheels 120/122, and left-side spreader wheel paddle actuators 326A for controlling radial/pitch angle of paddles 120A/122A-120D/122D. Combine controller 310 also controls right-side spreader wheel rotational motor(s) and/or valves 318B (e.g. electric motors for electrically driven wheels 120/122, or hydraulic valves and/or hydraulic motors for hydraulically driven wheels 120/122) for controlling rotational speed of wheels 120/122, and right-side spreader wheel paddle actuators 326B for controlling radial/pitch angle of paddles 120A/122A-120D/122D.

Control of devices 318A/326A may be independent of control of devices 318B/326B. For example, devices 318A/326A may be controlled to vary wheel rotational speed and/or paddle angles of the left side spreader according to a first independent algorithm, while devices 318B/326B may be controlled to vary wheel rotational speed and/or paddle angles of the right side spreader according to a second independent algorithm. Conversely, control of devices 318B/326B may be dependent on control of devices 318B/326B and vice versa. In one example, 318A/326A and 318B/326B may be controlled increase rotational speed of left-side wheel 120 and the rotational speed of right-side wheel 122 in sync with one another. In another example, 318A/326A may be controlled to increase rotational speed of left-side wheel 120 while 318B/326B is controlled to decrease the rotational speed of right-side wheel 122, and vice versa. This alternating type of controller allows peak power consumption of the spreader wheels to be reduced while also allowing power to be recycled in certain scenarios. For example, when the speed of wheel 120 is increased and 122 is decreased, peak power is reduced because only one motor is consuming power at a time. In addition, when the motors driving wheels 120/122 are electric motors, the braking of electric motor 120, for example, will generate electrical power that can be recycled and fed to electric motor 122 (and vice versa) or stored in a battery 313 (see FIG. 3A) for later use.

Figure 4:
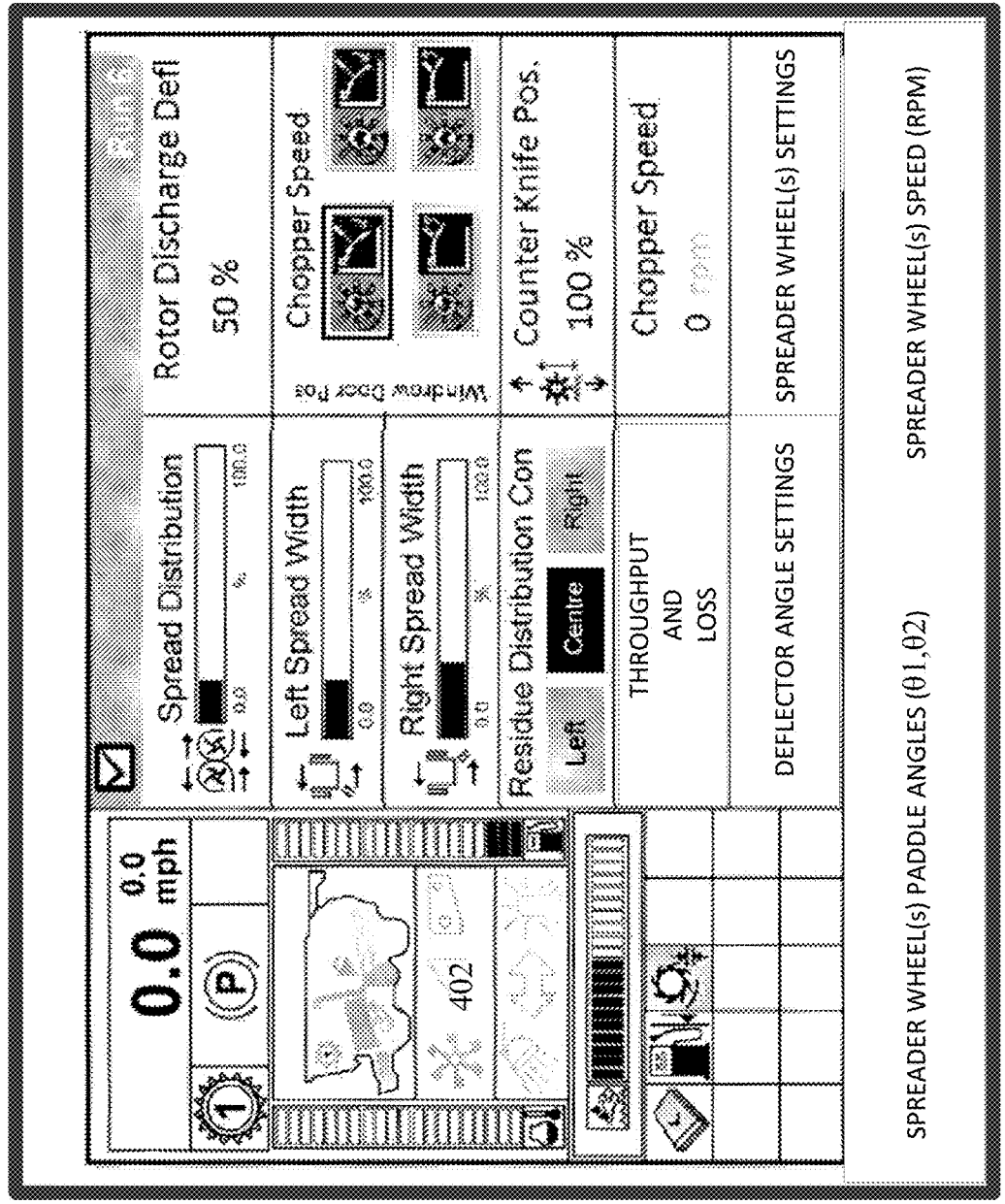
FIG. 4 is a view of a graphical user interface showing spreader wheel settings and performance parameters, according to an embodiment of the invention.

In order to set the spreader wheel rotational speed and paddle angle parameters discussed above, the operator may use an interface 311 as shown in FIG. 4 where the various parameters and data are displayed to the operator and are modifiable through a graphical user interface (GUI) 400. These may include a view of the map 402 with designated zones (e.g. spreading zones), land grade (not shown), current operational mode (spreading/windrow modes), and operational parameters/states for the spreader wheels, chopper, counter knives, windrow door, spreader wheels, spreader deflectors, etc. These parameters (e.g. nominal speed/angle values, oscillation period, and oscillation range) may be set or changed by the operator prior to harvesting or during harvesting. The operator can use a stylus or their finger on the touchscreen to set these parameters.

Figure 5A:
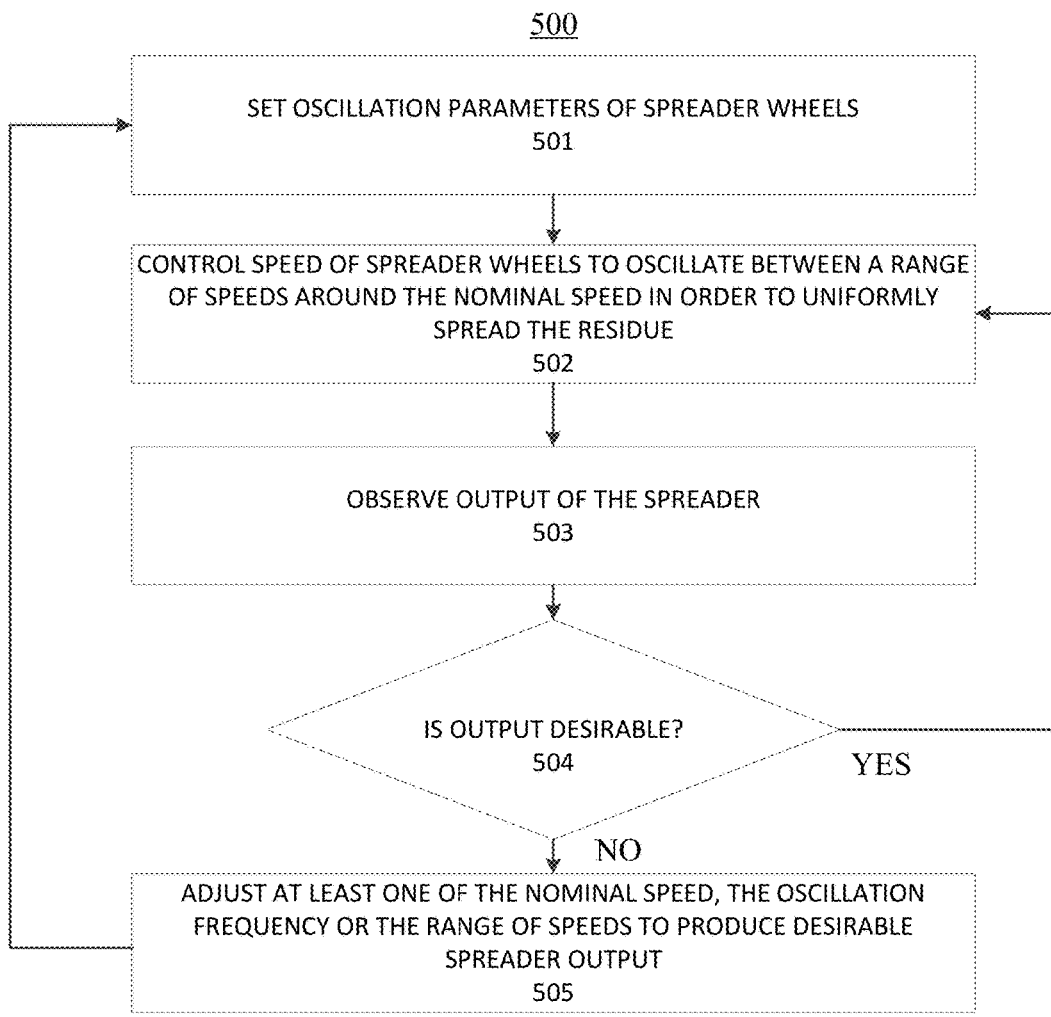
FIG. 5A is a flowchart for controlling the operational speed of the spreader wheels for achieving a uniform residue spread pattern, according to an embodiment of the invention.

FIG. 5A is a flowchart showing a method 500 for controlling the rotational speed of the spreader wheels for achieving a uniform residue spread pattern. In step 501, the controller or operator sets the oscillation parameters (e.g. nominal speed, oscillation period, oscillation speed range) of the spreader wheels. In step 502, the controller controls the electric motors and/or hydraulic valves of the spreader wheels 120/122 to oscillate rational speed of spreader wheels 120/122 based on these parameters. Either the operator observes the output spread or the combine, via a camera (not shown), monitors the output spread in step 503. If the output spread is determined to be desirable (e.g. uniform) in step 504, then the spreading continues using the same parameters. However, if the output spread is determined to be undesirable (e.g. non-uniform) in step 504, then the operator or the controller adjusts one or more of the parameters in step 505 with the goal of achieving a desirable output spread.

Figure 5B:
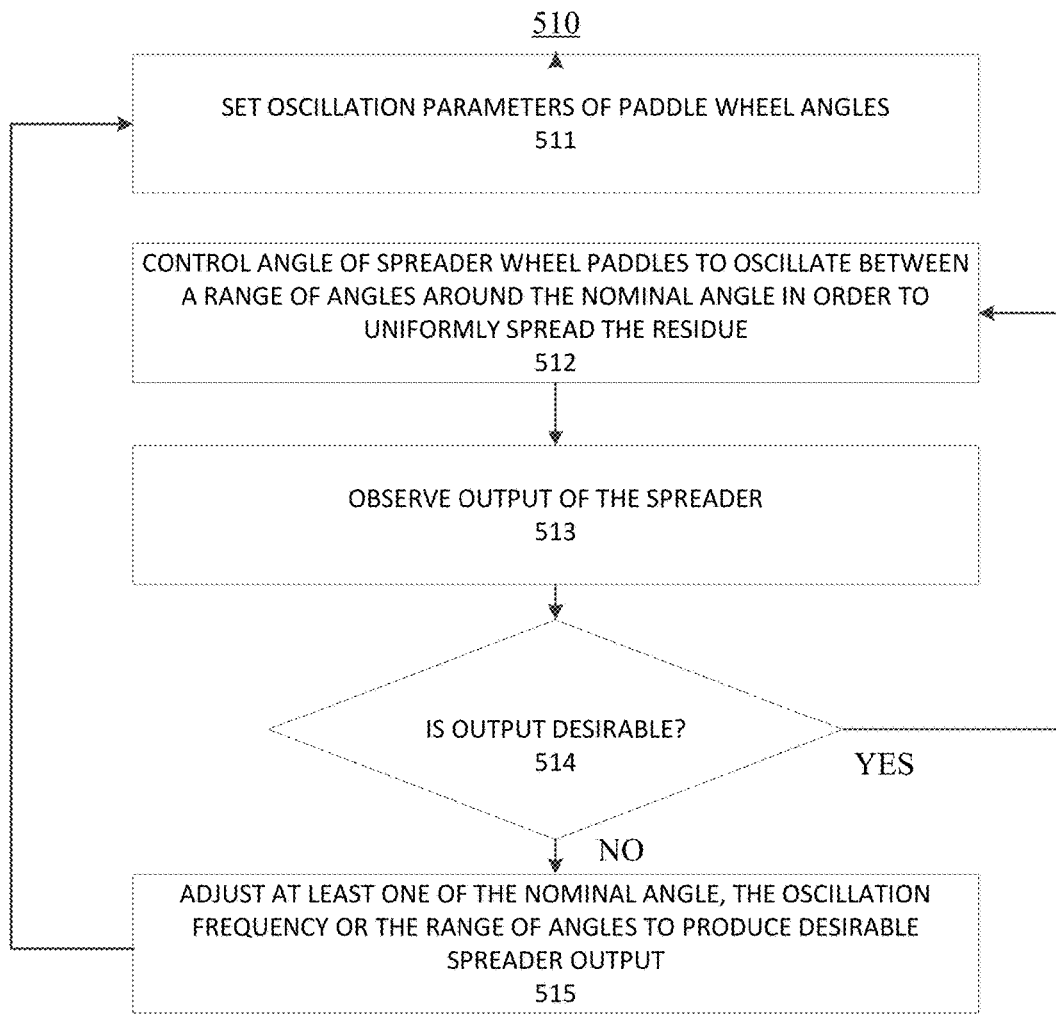
FIG. 5B is a flowchart for controlling the spreader wheel paddle angles for achieving a uniform residue spread pattern, according to an embodiment of the invention.

FIG. 5B is a flowchart showing a method 510 for controlling the angles of the spreader wheel paddles for achieving a uniform residue spread pattern. In step 511, the controller or operator sets the oscillation parameters (e.g. nominal paddle angle, oscillation period, oscillation angle range) of the spreader wheel paddles. In step 512, the controller controls the actuators of the paddles to oscillate the angles (e.g. pitch/radial angles) of the paddles based on these parameters. Either the operator observes the output spread or the combine, via a camera (not shown) monitors the output spread in step 513. If the output spread is determined to be desirable (e.g. uniform) in step 514, then the spreading continues using the same parameters. However, if the output spread is determined to be undesirable (e.g. non-uniform) in step 514, then the operator or the controller adjusts one or more of the parameters in step 515 with the goal of achieving a desirable output spread.

Although FIGS. 5A and 5B are described with respect to achieving a uniform spread, there could be scenarios where a non-uniform spread is desirable. In such a scenario, the operator or the controller adjusts sets/adjusts the parameters with the goal of achieving a non-uniform spread. This may include an oscillation behavior that is not symmetrical like the sinusoidal behavior shown in FIG. 4.

In addition, although FIGS. 5A and 5B are described as separately controlling the rotational speed of the spreader wheels and the angles of the paddles, these control methods could be combined. In such a scenario, the operator or controller could set both oscillation rotational speed parameters and oscillation paddle angle parameters. The controller could then oscillate both the rotational speed and the paddle angles in a manner that produces a uniform output spread (e.g. rational speed and paddle angle can decrease/increase at the same time).

Steps 501-515 of FIGS. 5A and 5B are performed by controller 310 upon loading and executing software code or instructions which are tangibly stored on a tangible computer readable medium 316, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the steps shown in FIGS. 5A and 5B, are implemented in software code or instructions which are tangibly stored on a tangible computer readable medium. Upon loading and executing such software code or instructions by the controller 310, the controller 310 may perform any of the functionality of the controller 310 described herein, including the steps shown in FIGS. 5A and 5B described herein.

It is to be understood that the operational steps are performed by the controller 310 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 310 described herein is implemented in software code or instructions which are tangibly stored on a tangible computer readable medium. Upon loading and executing such software code or instructions by the controller 310, the controller 310 may perform any of the functionality of the controller 310 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A combine comprising:
   a feeder housing for receiving harvested crop;
   a separating system for threshing the harvested crop to separate grain from residue;
   a first residue spreader wheel for expelling the residue from the combine;
   a second residue spreader wheel for expelling the residue from the combine; and
   a controller that controls each of the first and second residue spreader wheels to continuously oscillate between a first speed less than a nominal speed and a second speed greater than the nominal speed while spreading the residue,
   wherein the controller alternately controls the speeds of the first and second residue spreader wheels such that when the first residue spreader wheel rotational speed increases, the second residue spreader wheel rotational speed decreases, and vice versa.

2. The combine of claim 1, further comprising:
   a first electric motor for spinning the first residue spreader wheel,
   wherein the controller continuously varies an electrical current supplied to the first electric motor to control the first residue spreader wheel to continuously oscillate between the first speed and the second speed.

3. The combine of claim 2,
   further comprising a battery configured to store electrical power produced by the first electric motor when the first spreader wheel rotational speed is decreasing.

4. The combine of claim 2,
   wherein the controller is further configured to:
   when the first residue spreader wheel rotational speed is decreasing, supply electrical power produced by the first electric motor to drive a second electric motor of the second residue spreader wheel, and
   when the second residue spreader wheel rotational speed is decreasing, supply another electrical power produced by the second electric motor to drive the first electric motor of the first residue spreader wheel.

5. The combine of claim 1, further comprising:
   a first hydraulic motor for spinning the first residue spreader wheel,
   wherein the controller continuously varies a hydraulic pressure supplied to the first hydraulic motor to control the first residue spreader wheel to continuously oscillate between the first speed and the second speed.

6. The combine of claim 5,
   wherein the controller is further configured to:
   when the first residue spreader wheel rotational speed is decreasing, increase the hydraulic pressure supplied to drive a second hydraulic motor of the second residue spreader wheel, and
   when the second residue spreader wheel rotational speed is decreasing, increase the hydraulic pressure supplied to drive the first hydraulic motor of the first residue spreader wheel.

7. The combine of claim 1,
   wherein the controller is further configured to:
   receive residue spread pattern feedback from a sensor, and
   control the first residue spreader wheel to modify the residue spread pattern based on the feedback.

8. The combine of claim 7, further comprising:
   wherein the controller is further configured to adjust at least one of the nominal speed, the first speed, the second speed or the frequency of oscillation to modify the residue spread pattern based on the feedback.

* * * * *